United States Patent
Ou

(10) Patent No.: US 9,384,372 B2
(45) Date of Patent: Jul. 5, 2016

(54) BARCODE DETECTING AND MARKING DEVICE

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventor: Xiao-Lu Ou, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 64 days.

(21) Appl. No.: 14/460,144

(22) Filed: Aug. 14, 2014

(65) Prior Publication Data

US 2015/0048158 A1 Feb. 19, 2015

(30) Foreign Application Priority Data

Aug. 16, 2013 (CN) .......................... 2013 1 0357431

(51) Int. Cl.
*G06F 17/00* (2006.01)
*G06K 5/02* (2006.01)

(52) U.S. Cl.
CPC ........................................ *G06K 5/02* (2013.01)

(58) Field of Classification Search
CPC ................................... G06K 5/00; G06K 5/02

USPC .......................................................... 235/375
See application file for complete search history.

(56) References Cited

U.S. PATENT DOCUMENTS

| 2005/0029350 A1* | 2/2005 | Jusas | G06K 5/02 235/451 |
| 2013/0038670 A1* | 2/2013 | Chen | B41J 35/36 347/107 |

FOREIGN PATENT DOCUMENTS

| CN | 1387163 | * 12/2002 |
| TW | 507169 B | 10/2002 |
| TW | M395585 U1 | 1/2011 |

* cited by examiner

*Primary Examiner* — Laura Gudorf
(74) *Attorney, Agent, or Firm* — Zhigang Ma

(57) ABSTRACT

A barcode detecting and marking device can include a base, a transmission mechanism mounted on the base, a marking mechanism mounted on the base, a code reader adjacent to the transmission mechanism, and a controlling platform adjacent to the base. The transmission mechanism can include a supporting assembly mounted on the base, and a transmission assembly coupled to the supporting assembly. The transmission assembly can include a feeding tray coupled to the supporting assembly, a rolling tray coupler to the supporting assembly, and a first driver coupled to the supporting assembly and the rolling tray. The first driver rotates the rolling tray. The marking mechanism can include a driving member mounted on the base, and an execution member. The controlling platform can be electrically coupled to the transmission mechanism and the code reader.

16 Claims, 5 Drawing Sheets

BARCODE DETECTING AND MARKING DEVICE

FIELD

The present disclosure relates to barcode detecting and marking devices.

BACKGROUND

After a barcode has been printed onto a barcode label, a barcode detecting and marking device can be used to detect the barcode and deliver a marking on a barcode label with an unreadable/incorrect barcode.

BRIEF DESCRIPTION OF THE DRAWINGS

Implementations of the present technology will now be described, by way of example only, with reference to the attached figures.

DETAILED DESCRIPTION

Figure 1:
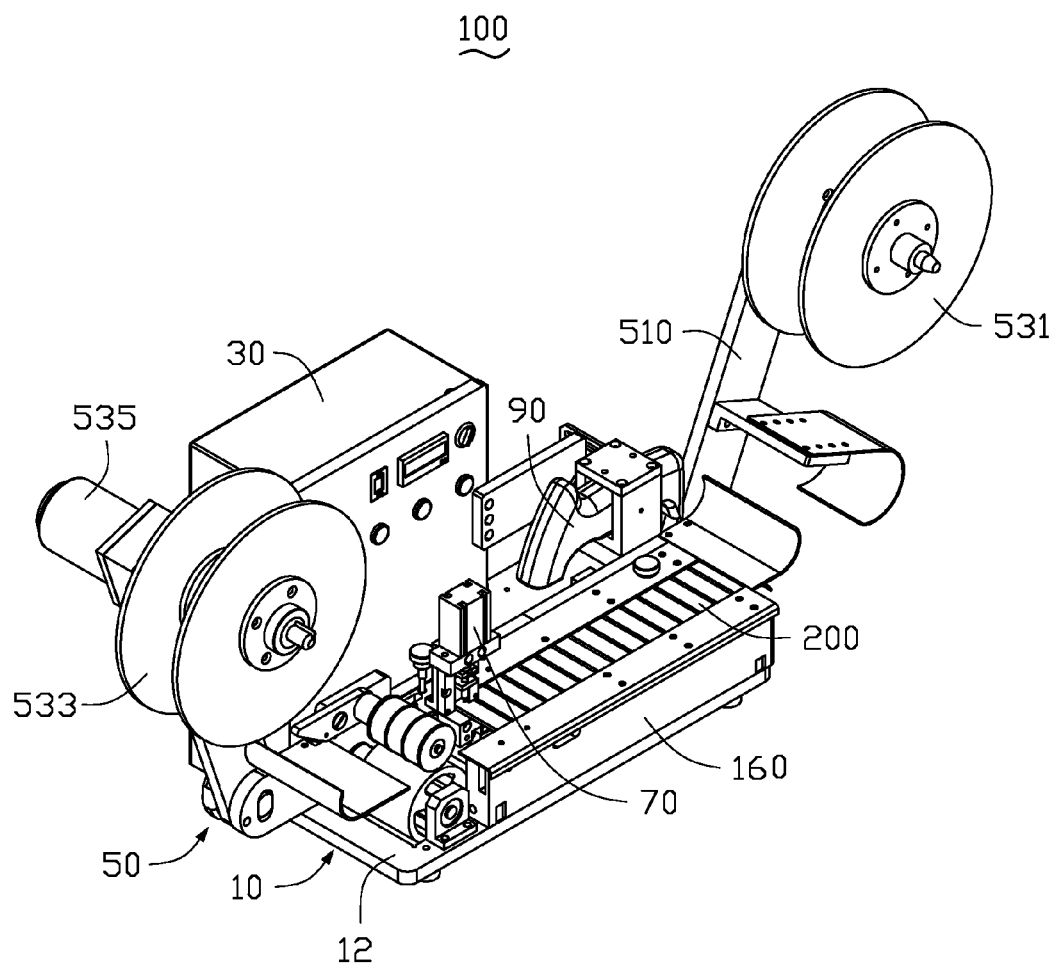
FIG. 1 is an isometric view of an embodiment of a barcode detecting and marking device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to barcode detecting and marking devices.

A barcode detecting and marking device which is able to detect a barcode on a barcode label and deliver a marking on a barcode label with an unreadable/incorrect barcode is described. The barcode detecting and marking device can include a base, a transmission mechanism mounted on the base, a marking mechanism mounted on the base, a code reader adjacent to the transmission mechanism, and a controlling platform adjacent to the base. The transmission mechanism can include a supporting assembly mounted on the base, and a transmission assembly coupled to the supporting assembly. The transmission assembly can include a feeding tray coupled to an end of the supporting assembly, a rolling tray coupled to an opposite end of the supporting assembly, and a first driver coupled to the supporting assembly and the rolling tray. The first driver can rotate the rolling tray. The marking mechanism can include a driving member mounted on the base and a execution member coupled to an end of the driving member facing the base. The controlling platform can be electrically coupled to the transmission mechanism and the code reader. An end of the strip of barcode labels can be wound on the feeding tray, the other end can be wound on the base and the marking mechanism and coupled to the rolling tray. The code reader can be configured to collect information from barcode of a barcode label, and transfer the collected information to the controlling platform. The controlling platform can be configured to recognize the collected information and determine if the information is incorrect, if the recognized information is incorrect, cause the controlling platform to control the transmission mechanism to convey the barcode label bearing the recognized information to the marking mechanism, and the driving member to move the execution member to deliver a marking (as hereinafter described) on an incorrect barcode label.

FIG. 1 illustrates an embodiment of a barcode detecting and marking device 100. The barcode detecting and marking device 100 can be configured to detect a barcode on a barcode label 200, and if the barcode is unreadable/incorrect, the barcode detecting and marking device 100 can deliver a mark on the barcode label 200. The barcode detecting and marking device 100 can include a base 10, a controlling platform 30, a transmission mechanism 50, a marking mechanism 70, and a detecting mechanism 90. The controlling platform 30, the transmission mechanism 50, and the marking mechanism 70 can be mounted on the base 10. The detecting mechanism 90 can be mounted to the controlling mechanism 30.

A plurality of barcode labels 200 can be pasted in a strip and the strip can be rolled into a roll and can be wound on the transmission mechanism 50. The controlling platform 30 can be electrically coupled to the transmission mechanism 50, the marking mechanism 70, and the detecting mechanism 90. The controlling platform 30 can control the transmission mechanism 50 to feed the strip of barcode labels 200. The detecting mechanism 70 can detect and read an information of the barcode on the barcode label 200, and transfer the information to the controlling platform 30. The controlling platform 30 can recognize the information. If the recognized information is incorrect, the controlling platform 30 can control the marking mechanism 70 to deliver a marking on the barcode label 200.

Figure 2:
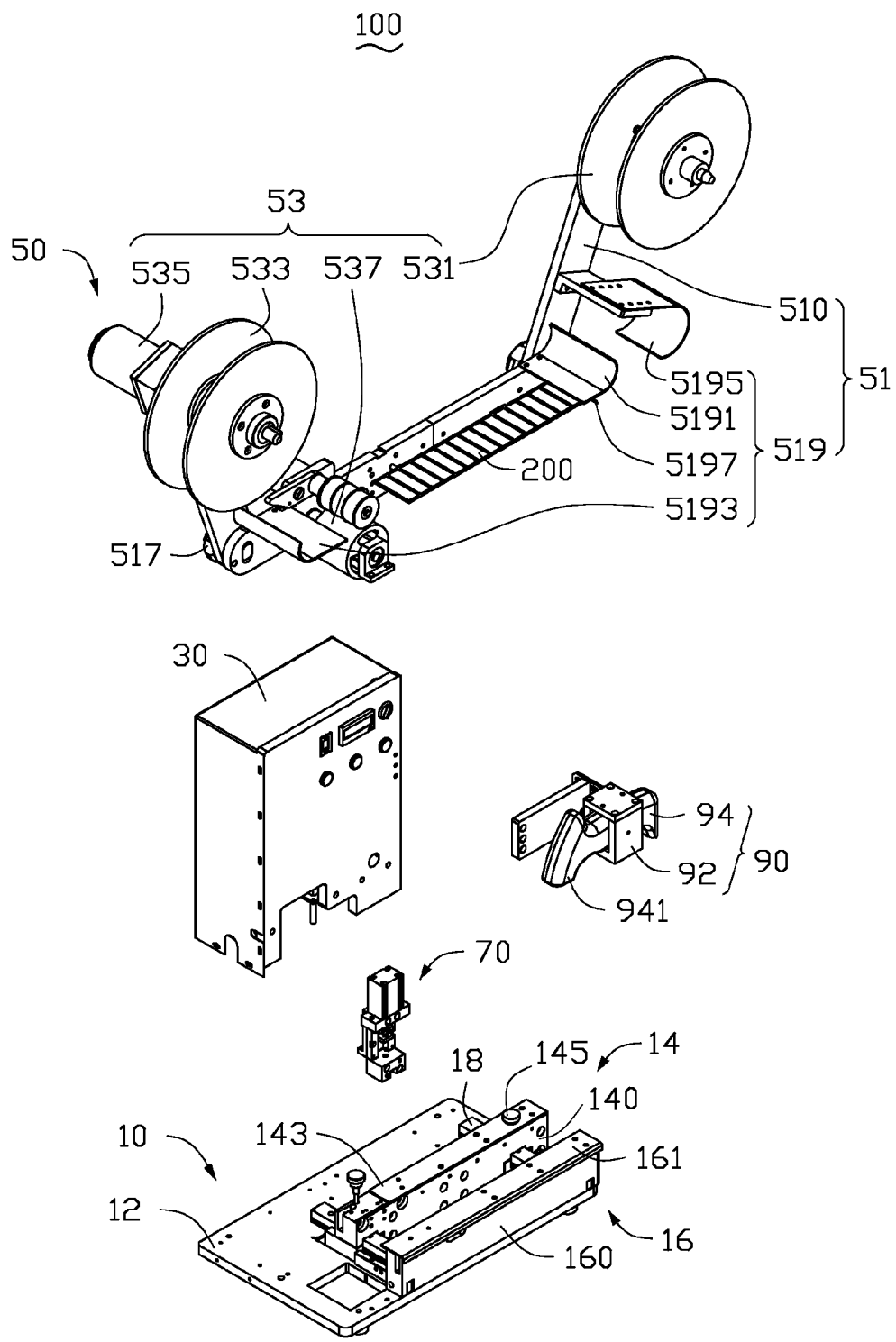
FIG. 2 is an exploded, isometric view of the barcode detecting and marking device of FIG. 1.
Figure 3:
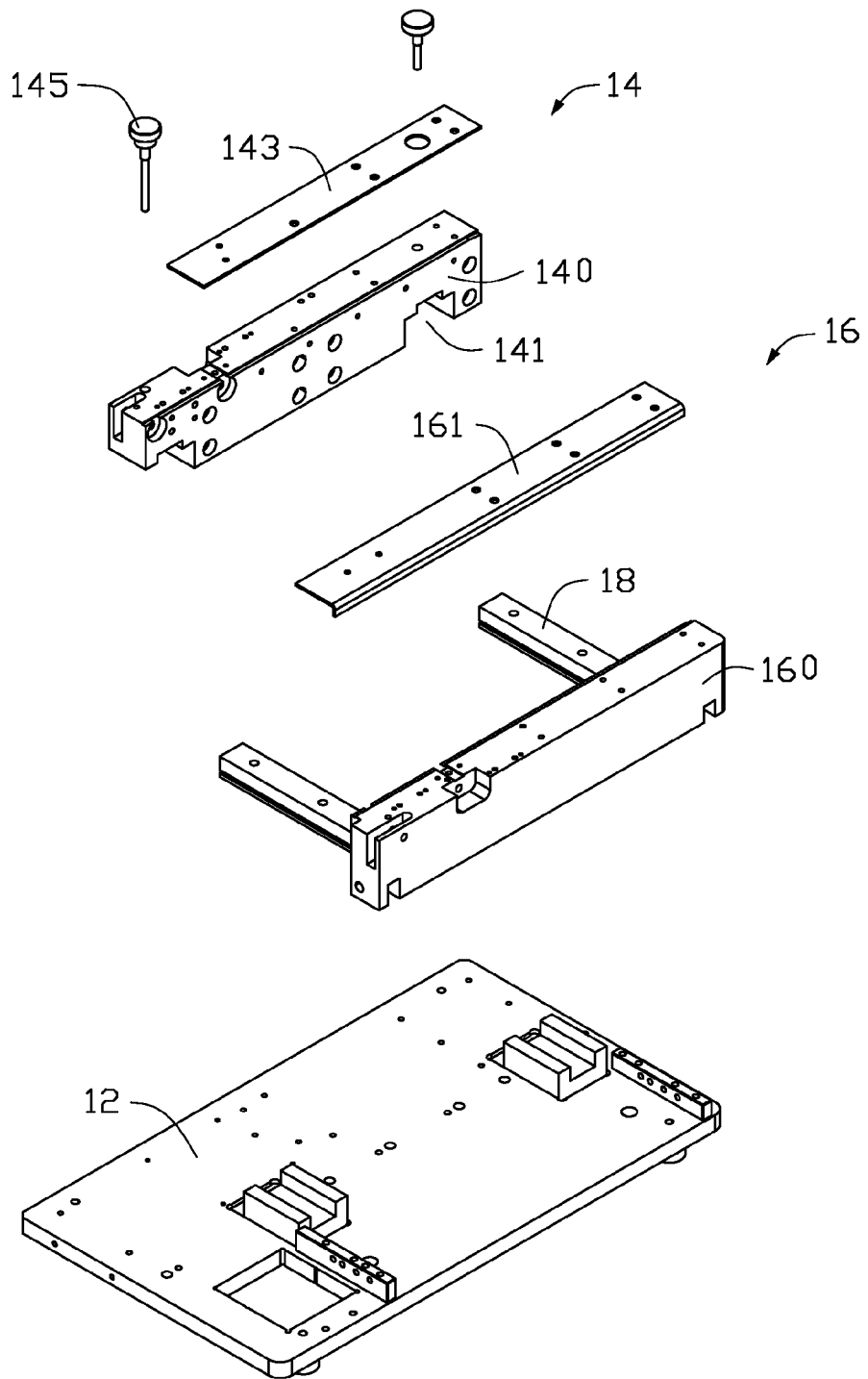
FIG. 3 is an exploded, isometric view of a base of the barcode detecting and marking device of FIG. 1.

Also referring to FIGS. 2-3, the base 10 can be arranged in a working environment configured to support and hold the controlling platform 50, the transmission mechanism 70, and the marking mechanism 90. The base 10 can include a base plate 12, a holding assembly 14, a movable assembly 16, and two guiding rails 18. The holding assembly 14 and the movable assembly 16 can be mounted on the base plate 12 parallel to each other. The guiding rails 18 can be positioned between the holding assembly 14 and the movable assembly 16.

The base plate 12 can be substantially a rectangular plate. The holding assembly 14 can include a holding member 140 mounted on the base plate 12, a first cover 143 coupled to the holding member 140, and two fasteners 145 positioned on the first cover 143. The holding member 140 can be substantially a rectangular block. The holding member 14 can define two slots 141 on a surface adjacent to the base plate 12. Each slot 141 can extend perpendicularly towards the movable assembly 16 from one side of the holding member 140 to the opposite side. The two slots 14 can be parallel to each other and respectively positioned on opposite ends of the holding member 140. The first cover 143 can be substantially a rectangular plate, and can be stacked on a surface of the holding member 140 away from the base plate 12. There can be a first gap between the first cover 143 and the holding member 140 adjacent to the movable assembly 16. The first gap can be configured to partially receive the strip of barcode labels 200. In the illustrated embodiment, the fasteners 145 can be screws or bolts. The fasteners 145 can be inserted through the first cover 143 and coupled to the holding member 140 such that the first cover 143 can be fixed on the holding member 140. The two fasteners 145 can correspond to the two slots 141. An end of each fastener 145 can extend into a slot 141.

The movable assembly 16 can include a movable member 160 mounted on the base plate 12 and a second cover 161 coupled to the movable member 160. The movable member 160 can be substantially a rectangular block, and can be slidably mounted on the base plate 12. The second cover 14 can correspond to the first cover 143. There can be a second gap between the second cover 161 and the movable member 160 adjacent to the first cover 143. The gap can be configured to partially receive the strip of barcode labels 200.

The two guiding rails 18, to correspond to the two slots 141, can be substantially rectangular blocks. An end of each guiding rail 18 can be coupled to the movable member 160 and an opposite end guiding rail 18 can be inserted into a slot 14 such that the fasteners 145 can resist against the movable members 160 in the slots 141, to position the movable assembly 16. A side of the strip of barcode labels 200 can be slidably received in the first gap between the first cover 143 and the holding member 140 and an opposite side of the strip of barcode labels 200 can be slidably received in the second gap between the second cover 161 and the movable member 160. The fasteners 145 can be unscrewed away from the guiding rails 18, enabling the guiding rails 18 to freely slide in the slots 14 such that the movable assembly 16 can be moved closer to the holding assembly 14, and a distance between the holding assembly 14 and the movable assembly 16 can be reduced. Thus, the detecting and marking device 100 can accept barcode labels 200 in different sizes.

The controlling platform 30 can be mounted on the base plate 12 and positioned at a side of the holding assembly 14 away from the movable assembly 16. The controlling platform 30 can have a built-in program, and can be electrically coupled to the transmission mechanism 50, the marking mechanism 70, and the detecting mechanism 90. The controlling mechanism 30 can control the mechanisms mentioned above to execute and complete a barcode detecting and marking process.

The transmission mechanism 50 can include a supporting assembly 51 mounted on the base plate 12, and a transmission assembly 53 mounted on the supporting assembly 53.

Figure 4:
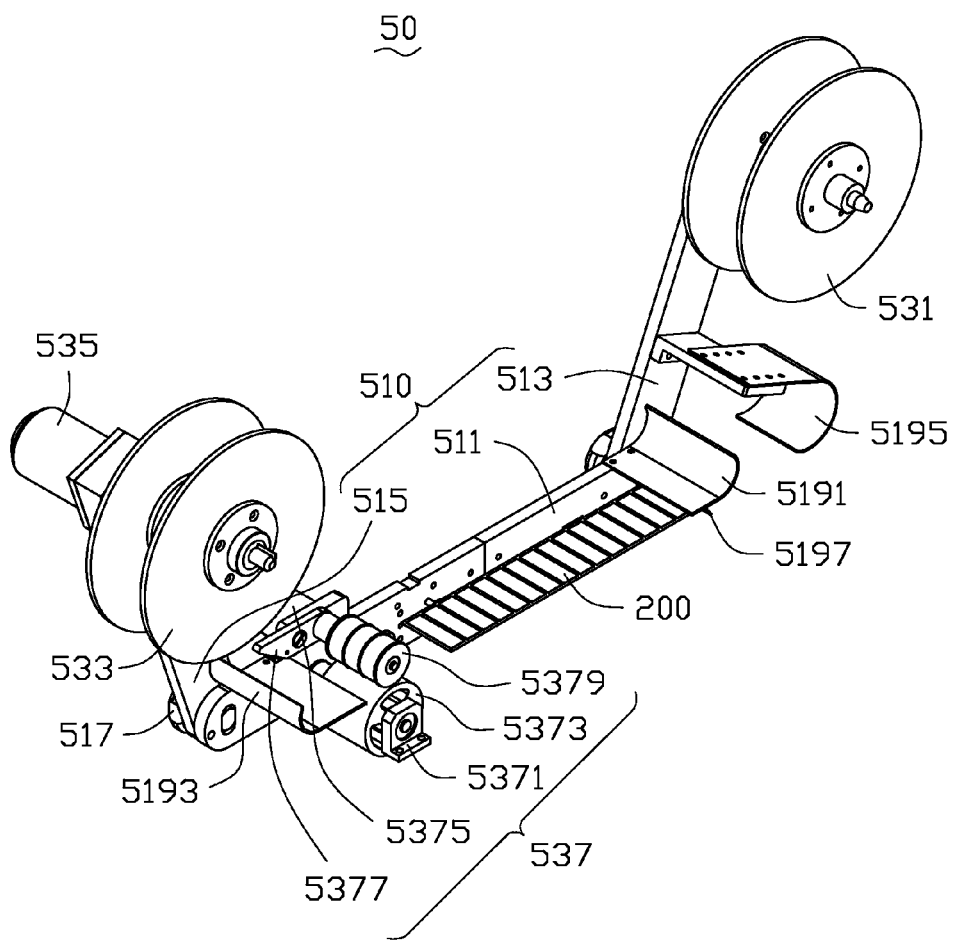
FIG. 4 is an isometric view of a transmission mechanism of the barcode detecting and marking device of FIG. 1.

Referring to FIG. 4, the supporting assembly 51 can include a plurality of supporting arms 510, and a feeding member 519 is coupled to each of the supporting arms 510. In the illustrated embodiment, there can be three supporting arms 510. The supporting arms 510 can include first supporting arm 511 coupled to the base plate 12, one end of the first supporting arm 511 can carry a second supporting arm 513, and the other end of the first supporting arm 511 can carry a third supporting arm 515. The first, second, and third supporting arms 511, 513, and 515 can be substantially bar-shaped. The first supporting arm 511 can be positioned between the holding assembly 14 and the controlling platform 30, and can be parallel to the holding member 140. Opposite ends of the first supporting arm 511 can extend out of the base plate 12. A locking member 517 can be positioned at each end of the first supporting arm 511. An end of the second supporting arm 513 and an end of the third supporting arm 515 can be respectively coupled to opposite ends of the first supporting arm 511, and can be fixed by a locking member 517. The second supporting arm 513 can intersect with the first supporting arm 511 at a certain angle of less than 180 degrees. The third supporting arm 515 can intersect with the first supporting arm 511 at a certain angle of less than 180 degrees. The certain angle defined by the second supporting arm 513 and the first supporting arm 511 and the certain angle defined by the third supporting arm 515 and the first supporting arm 511 can be adjusted, such that a distance between an end of the second supporting arm 513 away from the first supporting arm 511 and the an end of the third supporting arm 515 away from the first supporting arm 511 can be lengthened or shortened.

The feeding members 519 can be mounted on the supporting arms 510 and configured to guiding an unwinding movement of the strip of barcode labels 200. The feeding members 519 can each be a curved plate and spaced from each other. In the illustrated embodiment, there can be four feeding members 519. The four feeding members 519 can include a first feeding member 5191, a second feeding member 5193, a third feeding member 5195, and a fourth feeding member 5197. The first feeding member 5191 and the second feeding member 5193 can be positioned on opposite ends of the first supporting arm 511. The first feeding member 5191 can be adjacent to the second supporting member 513. An end of the first feeding member 5191 away from the second feeding member 5193 can be curved as it departs from the base plate 12. The second feeding member 5193 can be adjacent to the third supporting member 515. An end of the second feeding member 5193 away from the first feeding member 5191 can be curved as it departs from the base plate 12. The third feeding member 5195 can be mounted on the second supporting arm 513. An end of the third feeding member 5195 can be curved towards the base plate 12. The fourth feeding member 5197 can be mounted at an end of the holding assembly 14 adjacent to the second supporting arm 513, and received between the holding member 140 and the movable member 160. The fourth feeding member 5197 can be positioned at a side of the second feeding member 5193 facing the base plate 12. An end of the fourth feeding member 5197 can be curved towards the base plate 12. There can be a third gap between the second feeding member 5193 and the fourth feeding member 5197, to enable the strip of barcode labels 200 to go through.

The transmission assembly 53 can include a feeding tray 531, a rolling tray 533, a first driver 535, and a second driver 537. The feeding tray 531 can be mounted at an end of the second supporting member 513 away from the first supporting arm 511. The feeding tray 531 can be configured to support a roll of barcode labels 200. The rolling tray 533 can be mounted at an end of the third supporting arm 515 away from the first supporting arm 511. The first driver 535 can be mounted on the third supporting arm 515 and coupled to the rolling tray 533. In the illustrated embodiment, the first driver 535 can be a motor. The first driver 535 can rotate the rolling tray 533 to wind up and collect the detected barcode labels 200. The second driver 537 can be adjacent to the third supporting arm 515 and configured to cooperate with the first driver 535 to collect the strip of barcode labels 200. The second driver 537 can include a supporting base 5371, a driving rod 5373, a transmission member 5375, an adjusting member 5377, and a pressing member 5379. An end of the supporting base 5371 adjacent to the movable member 160 can be mounted to the base plate 12. The driving rod 5373 can be substantially a cylindrical shaft. An outer surface of the driving rod 5373 can be a high-friction surface. An end of the driving rod 5373 can be rotatably inserted into the supporting base 5371, the other end can be rotatably inserted into the first supporting arm 511. The driving rod 5373 can be positioned adjacent to an end of the holding assembly 14, adjacent to the third supporting arm 515. Transmission member 5375 can be mounted on the base plate 12 to correspond to the driving rod 5373. In the illustrated embodiment, the transmission member 5375 can be a servo motor. The transmission member 5375 can be coupled to the driving rod 5373 and rotate the driving rod 5373. The adjusting member 5377 can be mounted at a side of the first supporting arm 511 away from the base plate 12. The adjusting member 5377 can be fixed on the first supporting arm 511 by a fastener (not shown), and can rotate about the fastener, such that a position of the adjusting member 5377 can be adjusted relative to the first supporting arm 511. The pressing rod 5379 can be substantially a cylindrical shaft, and positioned at a side of the driving rod 5373 away from the base plate 12. The pressing rod 5379 can be spaced from the driving rod 5373 and mounted to the adjusting member 5377. There can be a fourth gap between the driving rod 5373 and the pressing rod 5379, to enable the strip of barcode labels 200 to go through. A width of the fourth gap can be adjusted by the adjusting member 5377, such that a pressure applied to the strip of barcode labels 200 can be adjusted. The transmission member 5375 can rotate the driving rod 5373, such that the strip of barcode labels 200 can be transferred through the fourth gap towards the rolling ray 533. Simultaneously, the rolling tray 533 can rotate to collect the strip of barcode labels 200.

Figure 5:
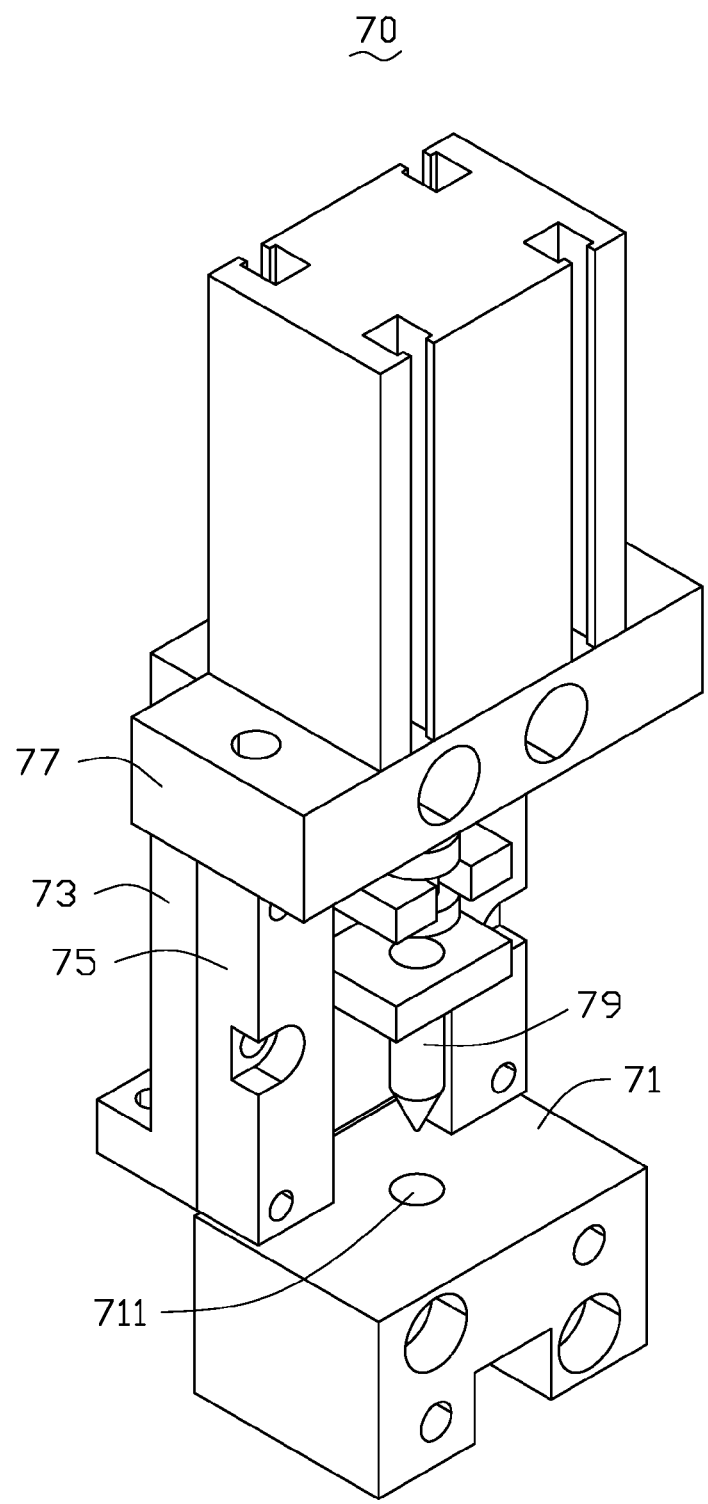
FIG. 5 is an enlarged, isometric view of a marking mechanism of the barcode detecting and marking device of FIG. 1.

Referring to FIG. 5, the marking mechanism 70 can be mounted to the holding assembly 14 adjacent to the pressing rod 5379, and configured to deliver a marking on the barcode labels 200. In the illustrated embodiment, the marking can be a through hole. The marking mechanism 70 can include a base body 71, a supporting member 73, two guiding members 75, a driving member 77, and an execution member 79. The base body 71 and the supporting member 73 can be mounted on the holding assembly 14. The guiding members 75 and the driving member 77 can be mounted to the supporting member 71. The execution member 79 can be coupled to the driving member 77.

The base body 71 can be substantially a rectangular block adjacent to the driving rod 5373, and positioned between the holding assembly 14 and the movable assembly 16. The base body 71 can define a longitudinal through hole 711. The base body 71 can be configured to support the barcode labels 200. The supporting member 73 can be substantially a rectangular plate and positioned at a side of the holding assembly 13 away from the base plate 12. The supporting member 73 can be adjacent and perpendicular to the base body 71. The guiding members 75 can each be a substantially rectangular block. The two guiding members 75 can be mounted on the supporting member 73 parallel to each other, and perpendicular to the base plate 12. The driving member 77 can be fixed to an end of the supporting member 73 away from the base body 71. In the illustrated embodiment, the driving member 77 can be an air cylinder. The execution member 79 can be mounted to an end of the driving member 77 facing the base plate 71, and positioned between the two guiding members 75. In the illustrated embodiment, the execution member 79 can be a punch. An end of the execution member 79 can correspond to the through hole 711. The driving member 71 can move the execution member 79 towards the base body 71, the execution member 79 can punch through the barcode label 200 on the base body 71 and be received in the through hole 711, such that a marking can be applied to an incorrect barcode label 200.

Referring to FIG. 2, the detecting mechanism 90 can include a mounting portion 92 mounted on the controlling platform 30, and a code reader 94 mounted to the mounting portion 92. The code reader 94 can include a reading end 941 facing the strip of barcode labels 200. In an alternative embodiment, the detecting mechanism 90 can be mounted on another member, so long as the reading end 941 can face the strip of barcode labels 200.

In operation, a roll of the barcode labels 200 can be positioned in the feeding tray 531. An end of the strip of barcode labels 200 can be wound onto the third guiding feeding member 5195, and inserted through the third gap, the first and the second gap, and the fourth gap, and finally wound onto the rolling tray 533. The controlling platform 30 can control the code reader 94 to read a barcode on one of the barcode labels 200. The code reader 94 can detect and read an information of the barcode, and transfer the information to the controlling platform 30. The controlling platform 30 can recognize the information. If the information is correct, the controlling platform 30 can control the first driver 535 and the second driver 537 to roll and collect one correct barcode label 200. If the information is incorrect, the first driver 535 and the second driver 537 can convey the incorrect barcode label 200 to the marking mechanism 70, and the execution member 79 can be brought to the barcode label 200. The driving member 77 can drive the execution member 79 to punch a hole on an incorrect barcode label 200. The controlling platform 30 can control the first driver 535 and the second driver 537 to roll and mark an incorrect barcode label 200.

In an alternative embodiment, the feeding members 519 can be omitted, such that an end of the first cover 143 adjacent to the second supporting arm 513 can be curved in departing from the base plate 12, and an end of the second cover 161 adjacent to the second supporting arm 513 can be curved in departing from the base plate 12, thus the guiding of the strip of barcode labels 200 can be smooth.

In an alternative embodiment, the second driver 537 can be omitted, such that the first driver 535 can rotate the rolling tray 533 to wind up and collect the strip of barcode labels 200.

The embodiments shown and described above are only examples. Many details are often found in the art such as the other features of a barcode reader and marker. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

The invention claimed is:

1. A barcode detecting and marking device configured to detect a barcode on a barcode label and mark an incorrect barcode on a barcode label, the barcode detecting and marking device comprising:
a base,
a transmission mechanism mounted on the base and comprising:
a supporting assembly mounted on the base; and
a transmission assembly comprising:
a feeding tray coupled to an end of the supporting assembly;
a rolling tray coupled to an opposite end of the supporting assembly; and
a first driver coupled to the supporting assembly and the rolling tray, configured to rotate the rolling tray;
a marking mechanism comprising:
a driving member mounted on the base; and
an execution member coupled to an end of the driving member facing the base;
a code reader positioned adjacent to the transmission mechanism; and
a controlling platform adjacent to the base,
wherein the controlling platform is electrically coupled to the transmission mechanism and the code reader,
an end of a strip of barcode labels is wound on the feeding tray, the other end is wound on the base and the marking mechanism and coupled to the rolling tray;
the code reader is configured to collect information from a barcode of a barcode label and transfer the collected information to the controlling platform;
the controlling platform is configured to recognize the collected information and determine if the recognized information is incorrect, and, if the recognized information is incorrect, cause the transmission mechanism to convey the barcode label bearing the recognized information to the marking mechanism and cause the driving member to move the execution member in order to mark the barcode label as being incorrect;
wherein the base comprises a base plate, a holding assembly, and a movable assembly; the holding assembly and the movable assembly are mounted on the base plate parallel to each other, and the strip of barcode labels is partially positioned between the holding assembly and the movable assembly; and
wherein the holding assembly comprises a holding member mounted on the base plate, and a first cover coupled to the holding member away from the base plate; a side of the strip of barcode labels is received between the first cover and the holding member.

2. The barcode detecting and marking device of claim 1, wherein the holding member defines at least one slot at a surface thereof facing the base plate, the slot extends perpendicularly towards the movable assembly; the base further comprises at least one guiding rail corresponding to the at least one slot; an end of the guiding rail is coupled to the movable assembly, an opposite end extends into the corresponding slot.

3. The barcode detecting and marking device of claim 2, wherein the holding assembly further comprises at least one fastener coupled to the first cover corresponding to the at least one slot; an end of the fastener extends through the first cover and the holding member and is received in the corresponding slot, and resists against the guiding rail.

4. The barcode detecting and marking device of claim 1, wherein the movable assembly comprises a movable member mounted on the base plate, and a second cover coupled to the movable member away from the base plate; an opposite side of the strip of barcode labels is received between the second cover and the movable member.

5. The barcode detecting and marking device of claim 1, wherein the marking mechanism further comprise a base body mounted to an end of the holding assembly adjacent to the rolling tray; the base body is positioned between the holding assembly and the movable assembly; the base body defines a through hole corresponding to the execution member; the through hole is configured to receive the execution member; the strip of barcode labels is supported on the base body.

6. The barcode detecting and marking device of claim 5, wherein the marking mechanism further comprise a supporting member mounted to a side of the holding assembly away from the base plate; the driving member is mounted on an end of the supporting member away from the base body.

7. The barcode detecting and marking device of claim 6, wherein the marking mechanism further comprise two guiding members mounted on the supporting member; the two guiding members are parallel to each other; the execution member is located between the two guiding members and faces the base body.

8. The barcode detecting and marking device of claim 1, wherein the supporting assembly comprises a first supporting arm, a second supporting arm, and a third supporting arm; the first supporting arm mounted on the base, the second supporting arm and the third supporting arm are respectively coupled to opposite ends of the first supporting arm; the feeding tray is mounted on an end of the second supporting arm away from the first supporting arm; the rolling tray and the first driver is mounted on an end of the third supporting arm away from the first supporting arm.

9. The barcode detecting and marking device of claim 8, wherein two locking members are respectively positioned at opposite ends of the first supporting arm, and respectively corresponds to the second supporting arm and the third supporting arm.

10. The barcode detecting and marking device of claim 8, wherein the transmission assembly further comprises a second driver adjacent to the third supporting arm; the second driver comprises a supporting base, a driving rod, a transmission member, and a pressing member; the supporting base is positioned on the base; an end of the driving rod is coupled to the first supporting arm, an opposite end is coupled to the supporting base; the transmission member is coupled to an end of the driving rod and configured to rotate the driving rod; the pressing rod is positioned at a side of the driving rod away from the base, and spaced from the driving rod.

11. The barcode detecting and marking device of claim 10, wherein the second driver further comprises an adjusting member coupled to the first supporting arm corresponding to the driving rod; an end of the pressing member is coupled to the adjusting member; a position of the adjusting member is capable of being adjusted relatively to the first supporting arm.

12. The barcode detecting and marking device of claim 10, wherein the supporting assembly further comprises a first feeding member and a second feeding member respectively coupled to opposite ends of the first supporting arm; the first feeding member is adjacent to the second supporting arm, an end of the first feeding member away from the second feeding member is curved as the end of the first feeding member departs from the base; the second feeding member is adjacent to the third supporting arm, an end of the second feeding member away from the first feeding member is curved as the end of the second feeding member departs from the base.

13. The barcode detecting and marking device of claim 12, wherein the supporting assembly further comprises a third feeding member and a fourth feeding member; the third feeding member is mounted on the second supporting arm, an end of the feeding member is curved towards the base; the fourth feeding member is coupled to the base and adjacent to the second supporting arm, an end of the fourth feeding member is curved towards the base.

14. The barcode detecting and marking device of claim 1, wherein the controlling platform is mounted on the base adjacent to the marking mechanism; the barcode detecting and marking device further comprises a mounting portion coupled to the controlling platform; the code reader is mounted on the mounting portion.

15. A barcode detecting and marking device configured to detect a barcode on a barcode label and deliver a marking on a barcode label with an incorrect barcode, the barcode detecting and marking device comprising:
a base,
a transmission mechanism mounted on the base and comprising:
  a supporting assembly mounted on the base; and
  a transmission assembly comprising:
    a feeding tray coupled to an end of the supporting assembly;
    a rolling tray coupled to an opposite end of the supporting assembly; and
    a first driver coupled to the supporting assembly and the rolling tray, configured to rotate the rolling tray;
a marking mechanism comprising:
  a driving member mounted on the base; and
  an execution member coupled to an end of the driving member facing the base; and
a code reader positioned adjacent to the transmission mechanism,
wherein an end of a strip of barcode labels is wound on the feeding tray, the other end is wound on the base and the marking mechanism and coupled to the rolling tray,
the code reader is configured to collect information from a barcode of a barcode label; if the information is incorrect, cause the transmission mechanism to convey the barcode label bearing the recognized information to the marking mechanism and cause the driving member to move the execution member in order to mark the corresponding barcode label as being incorrect;

wherein the base comprises a base plate, a holding assembly, and a movable assembly; the holding assembly and the movable assembly are mounted on the base plate parallel to each other, and the strip of barcode labels is partially positioned between the holding assembly and the movable assembly; and wherein the holding assembly comprises a holding member mounted on the base plate, and a first cover coupled to the holding member away from the base plate; a side of the strip of barcode labels is received between the first cover and the holding member.

16. A barcode detecting and marking device comprising:
a base,
a transmission mechanism mounted on the base, comprising:
  a supporting assembly mounted on the base; and
  a transmission assembly comprising:
    a feeding tray coupled to an end of the supporting assembly;
    a rolling tray coupled to an opposite end of the supporting assembly; and
    a first driver coupled to the supporting assembly and the rolling tray, configured to rotate the rolling tray;
a marking mechanism comprising:
  a driving member mounted on the base; and
  an execution member coupled to an end of the driving member facing the base;
a code reader positioned adjacent to the transmission mechanism; and
a controlling platform being adjacent to the base; wherein the controlling platform is electrically coupled to the transmission mechanism and the code reader;
wherein the base comprises a base plate, a holding assembly, and a movable assembly; the holding assembly and the movable assembly are mounted on the base plate parallel to each other, and a strip of barcode labels is partially positioned between the holding assembly and the movable assembly; and
wherein the holding assembly comprises a holding member mounted on the base plate, and a first cover coupled to the holding member away from the base plate; a side of the strip of barcode labels is received between the first cover and the holding member.

\* \* \* \* \*